Nov. 27, 1934.  A. E. RITTENHOUSE  1,982,123
INSECT EXTERMINATOR
Filed May 4, 1932

INVENTOR
Arthur E. Rittenhouse
Harold E. Stonebraker
ATTORNEY

Patented Nov. 27, 1934

1,982,123

UNITED STATES PATENT OFFICE 1,982,123

INSECT EXTERMINATOR

Arthur E. Rittenhouse, Honeoye Falls, N. Y., assignor to The A. E. Rittenhouse Co., Inc., Honeoye Falls, N. Y., a corporation of New York Application May 4, 1932, Serial No. 609,183

2 Claims. (Cl. 43—113)

This invention relates to improvements in insect exterminators, and particularly to that kind of exterminator which is provided with suitable illumination to attract insects, and a suitable electric circuit arranged to intercept their path to the light and electrocute the insects.

The principal object of this invention is to provide an insect electrocutor of this kind which is simple in construction, economical to use and make, which is ornamental in appearance, and at the same time more efficient than insect exterminators of this kind as heretofore constructed.

Another object of the invention is to provide an insect exterminator comprising a transparent or translucent globe which incloses suitable illuminating means, such as an electric lamp, for attracting insects to its surface on which suitable electrocuting means are provided.

Still another object of the invention is the provision of an illuminated globe for attracting insects, said globe having electrical conductors arranged in substantially parallel relation on its outer surface at suitable distances apart so that insects such as moths, beetles, mosquitoes or other pests will close a circuit between adjacent conductors of sufficient strength to electrocute the insects.

A still further object of the invention is the provision of an exterminator of this kind adapted to be connected with a usual lamp socket having an ordinary commercial current usually of 110 volts, and a transformer for changing the voltage as may be required, the secondary circuit being open and comprising conductors coiled on the globe in parallel relation alternately in such proximity that the circuit may be closed between adjacent conductors by an insect. Such a normally open circuit requires no power for its operation except when the circuit is closed between adjacent conductors.

Still another object of the invention is the provision of an insect exterminator comprising a globe having a lamp therein, said globe being open at its lower end and a closure for said lower end, said closure being detachably mounted thereon by novel means so that access to the lamp may be had through said open end, and is also adapted to catch dead insects falling from the surface of the globe.

To these and other ends, the invention consists in the construction and arrangement of parts that will appear from the following description when read in conjunction with the accompanying drawing, the novel features being pointed out in the claims at the end of the specification.

Figure 1:
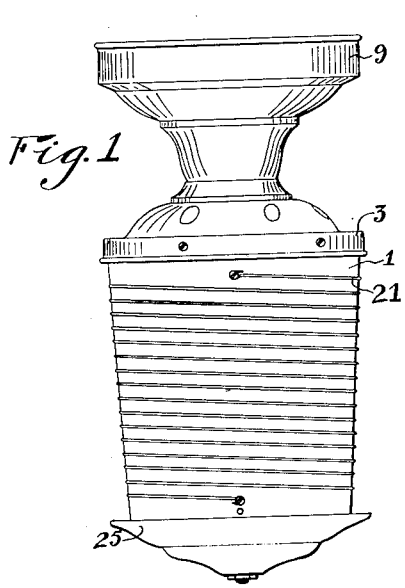
Fig. 1 is a front elevation of an insect exterminator constructed according to one possible embodiment of the invention.
Figure 2:
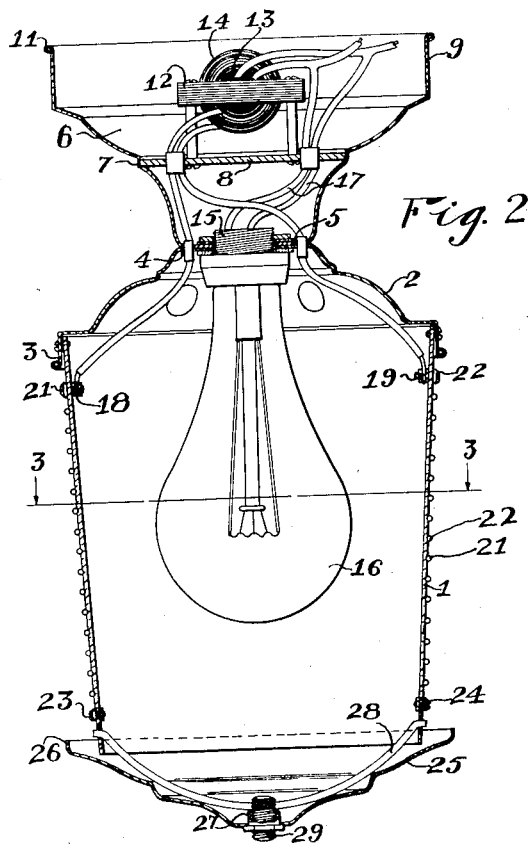
Fig. 2 is a central vertical section of the same somewhat enlarged.
Figure 4:
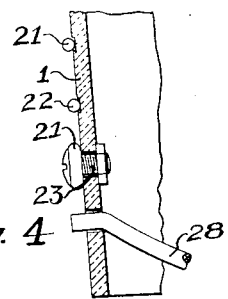
Fig. 4 is an enlarged fragmentary sectional view illustrating a detail construction.

It is a well known fact that many night flying or nocturnal insects, such as moths, beetles, mosquitoes and other pests are attracted by bright lights. The insect exterminator provided by this invention is designed to take advantage of this fact by providing a brightly illuminated globe with a death-dealing electric circuit on its outer surface. The apparatus is light and portable, so that by the use of extension conductors, it can be used in any suitable or desirable place such as a porch, or orchard where night flying pests which it is desired to destroy are prevalent.

The embodiment of the invention herein illustrated comprises a substantially frustro-conical globe 1 constructed of any suitable translucent or transparent non-conducting material such as glass, or a suitable non-breakable substitute which may be clear, frosted or colored as desired. The globe is hollow and open at both its ends. Its larger or upper end is closed by means of a frame or lamp support 2 preferably constructed of sheet material and having a downwardly projecting flange 3 which fits over the end of the globe to which it is secured by screws or other suitable means. The wall of the frame 2 projects inwardly from the top of the globe and is then bent upwardly and inwardly, terminating in a flat portion 4. The wall of the frame 2 may be provided with one or more openings as shown, to provide ventilation for the interior of the globe. Seated on and secured to this flat portion by soldering, spot welding or other suitable means is a corresponding flat portion 5 on the bottom of a housing or supporting member 6. The member 6 is also preferably constructed of sheet material and projects upwardly and outwardly from the bottom 5 and then vertically upward for a short distance to form the cylindrical portion 7 at the bottom of which is formed a seat for a support or shelf 8 for a purpose presently to be described.

From the top of the cylindrical part 7 its outer wall again flares outwardly and upwardly and at its upper end again extends vertically upward to form a second cylindrical portion 9 having a bead 11 surrounding its upper open end. This cylindrical portion 9 may be secured to any suitable hanger or support on which the exterminator is mounted.

Mounted on the shelf 8 is a suitable transformer 12 comprising a primary coil 13 and a secondary coil 14. The parts 4 and 5 have alined central openings in which is mounted a suitably insulated electric lamp socket 15 adapted to receive an electric lamp 16 of conventional type connected in parallel with the primary coil 13 of the transformer. The shelf 8 is provided with a pair of openings through one of which the conductors 17 are led to the lamp socket. The conductors from the secondary coil are arranged in the other of these openings and one through each of a pair of alined openings in the parts 4 and 5 to binding posts 18 and 19 adjacent the upper end of the globe 1 in which they are mounted. Conductors 21 and 22 are connected with the outer ends of the binding posts 18 and 19 respectively and are coiled spirally on the outer wall of the globe alternately in substantially parallel relation and at their lower ends are connected with binding posts 23 and 24 respectively mounted in the globe adjacent to its lower end. The distance between the adjacent coils of the non-insulated conductors 21 and 22 may vary with the tension of the current in the secondary coil and the nature of the insects or other pests to be destroyed. If desired, the conductors 21 and 22 may be secured to the outer wall of the globe to prevent "shorting" as a result of accidental displacement thereof. In the illustrated embodiment, they are seated in spiral grooves provided therefor in the outer surface of the globe. By the arrangement herein illustrated and described, the secondary circuit is normally open. When, however, an insect is attracted to the globe, it draws a charge between adjacent coils with which it comes in contact and is electrocuted.

Figure 3:
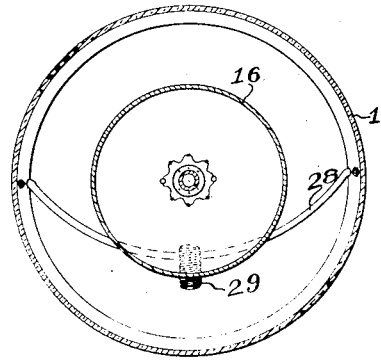
Fig. 3 is a horizontal section of the same taken substantially in the plane of line 3—3 of Fig. 2, the closure for the bottom of the globe being removed.
Figure 5:
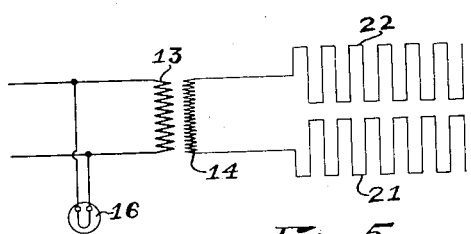
Fig. 5 is a diagram of the electric wiring.

In the embodiment illustrated, novel means are provided for covering the lower open end of the globe and affording a receptacle for the dead insects. Said means comprises a pan 25 preferably constructed of sheet material and having an annular portion or flange 26 spaced outwardly beyond the outermost portion of the globe. It is bent downwardly and inwardly from said flange toward the axial center of the globe where it is provided with an opening in which an internally threaded bushing 27 is fixed. A bail 28 of resilient flexible material is pivotally mounted in diametrically opposite openings in the wall of the globe adjacent its lower end. By reason of the resiliency of its material, the bail is sprung into the openings in the globe which is resiliently and frictionally engaged thereby to be retained in any position to which it is swung. Fixedly mounted on the bail 28 intermediate its ends is a threaded stud 29 on which the bushing 27 is threaded to support the bottom 25 on the globe. When it is desired to remove dead insects from the bottom or to give access to the interior of the globe as for replacing the lamp 16, the bottom 25 may be turned to release it from the stud 29, the bail can then be swung on its pivots to the position shown in Fig. 3, or to one side of the globe and out of the path of a lamp to be removed from or replaced in the globe.

It will be noted that the transformer and lamp are entirely inclosed. The conductors are also inclosed except the bare portions on the outer wall of the globe. The transformer is preferably a step-up transformer in which the voltage or tension of the current in the secondary coil is greater than that in the primary coil. By providing a current of high voltage in the secondary coil, the distance between the oppositely charged conductors 21 and 22 may be greater, and since there is a charged field in the neighborhood of each conductor, actual contact therewith is not necessary to draw the deadly spark. By changing the transformer, however, any required voltage may be maintained in the secondary circuit.

Although only one embodiment of the invention is shown and described herein, it will be understood that this application is intended to cover such changes or modifications as come within the spirit of the invention or scope of the following claims.

I claim:

1. In an exterminator, the combination of a globe open at its lower end, means for illuminating said globe, insect electrocuting means on the outer wall of said globe, a bail pivoted in the lower end of said globe and depending therefrom, a pan for the open end of the globe, and interengaging means on said pan and bail for removably supporting the pan on the bail beneath the open end of the globe.

2. In an exterminator, the combination of a globe open at its lower end, means for illuminating said globe, insect electrocuting means on the outer wall of the globe, a bail pivoted in the lower end of said globe and resiliently engaging the same to be retained in any position to which it may be moved, pan engaging means on said bail, a pan for the open end of the globe, and means cooperating with said pan engaging means for supporting the pan beneath the open end of the globe.

ARTHUR E. RITTENHOUSE.